United States Patent [19]

Sunabe

[11] Patent Number: 5,366,250

[45] Date of Patent: Nov. 22, 1994

[54] WIRE AND OUTLET BOX MARKERS

[76] Inventor: Thomas S. Sunabe, 1100 South Lincoln Ave., Monterey Park, Calif. 91754

[21] Appl. No.: 959,638

[22] Filed: Oct. 13, 1992

[51] Int. Cl.$^5$ .............................................. B42D 15/00
[52] U.S. Cl. ...................................... 283/81; 283/67; 283/114; 283/70; 283/74
[58] Field of Search .................. 283/81, 67, 114, 74, 283/70, 75, 81, 114

[56] References Cited

U.S. PATENT DOCUMENTS

| | | |
|---|---|---|
| 2,372,994 | 4/1945 | Welsh . |
| 2,681,732 | 6/1954 | Brady . |
| 2,818,168 | 12/1957 | Tobey et al. . |
| 2,831,277 | 4/1958 | Strachan . |
| 2,906,397 | 9/1959 | Simmons . |
| 3,038,597 | 6/1962 | Brady, Jr. . |
| 3,361,252 | 1/1968 | Wise . |
| 3,568,829 | 3/1971 | Brady . |
| 3,896,246 | 7/1975 | Brady, Jr. . |
| 4,235,459 | 11/1980 | Callahan ............................ 283/81 |
| 4,391,853 | 7/1983 | Pointon . |
| 4,578,136 | 3/1986 | Brown . |
| 4,609,208 | 9/1986 | Wrobel . |
| 5,244,233 | 9/1993 | McCraney ......................... 283/81 |

*Primary Examiner*—Paul A. Bell
*Attorney, Agent, or Firm*—Harris, Wallen, MacDermott & Tinsley

[57] ABSTRACT

A system for marking a plurality of separate electrical wires and electrical outlet locations in electrical construction wiring between a circuit breaker panel and a plurality of outlet boxes pursuant to a wiring diagram, including a marker carrier for carrying a plurality of separably adhered markers, a first set of wire markers comprising a first plurality of pairs of separable wire markers distinctively coded in a first manner and divided into a second plurality of subsets with wire markers of each subset further distinctively coded in a second manner, and a second set of outlet box markers comprising a corresponding second plurality of separable box markers distictively coded in the first manner, and further distinctively coded in the second manner. A method for installing electrical wires using the system.

4 Claims, 2 Drawing Sheets

WIRE AND OUTLET BOX MARKERS

BACKGROUND OF THE INVENTION

This invention relates to the installation of electrical wiring and in particular, to a system for marking electrical wires and outlet box locations for accuracy and ease in connecting wires between the fuse or circuit breaker panel and the individual outlet boxes and to a method of wiring using the system. Typically the outlet boxes provide for electrical power connections switches or sockets or lighting, but the system is usable with any type of outlet box.

In a typical electrical construction, a wiring diagram provides the locations of a circuit breaker panel and a plurality of outlet boxes and an indication of the particular terminal on the panel to be connected to the component at each outlet box. At the present time, the electrician works from the wiring diagram and places a strip of numbered tape around each wire adjacent each end. The specific number of each wire is also marked on the wall or floor near the outlet box for the wire is typically using a crayon or chalk. After the numbered wires are installed in a conduit or otherwise as desired, one end of a wire is connected to the panel terminal corresponding to the number on the wire. The other end of the wire with the same number is positioned at the outlet box with the corresponding number, ready for installation of the light or switch or other component. Of course, a fuse panel with the same electrical connections can be utilized and where the term "breaker panel" or "circuit breaker panel" is used. "fuse" panels are also included.

Typically the wire ends are marked with peelable strips carrying the appropriate numbers, with the strips initially mounted on a paper or plastic carrier or substrate and with the strips being separably peelable from the carrier. A typical package of the wire marker number strips are shown in the U.S. Pat. No. to Welsh, 2,372,994. Various arrangements for mounting the marker strips on the carrier are shown in other U.S. Pat. Nos. including Brady, 2,681,732; Tobey et al, 2,818,168; Strachan, 2,831,277; Simmons, 2,906,397; Brady, Jr., 3,038,597; Wise, 3,361,252; Brady, 3,568 829; Brady, Jr. 3,896,246; Pointon, 4,391,853; Brown, 4,578,136; and Wrobel, 4,609,208.

In these prior number strip packages, the numbers are sequential and all strips are of the same color.

An electrical diagram of a typical circuit breaker panel is shown at 11 in FIG. 1. This arrangement is nearly universally used with both the low-voltage systems, such as 120/208 volts, and the high-voltage systems, such as 277/480 volts. In many construction projects, both low and high voltage sources are used, such as the lower voltage for appliance outlets and the higher voltage for lighting.

The panel 11 provides for 42 lines, with odd numbered terminals on the left and even numbered terminals on the right, with each line comprising a wire connected to one of the numbered terminals and a second wire connected to the neutral. The three phases of the power supply are identified as A, B and C and are known as the black, red and blue phases, respectively. Four colors of wire insulation are used, with black, red and blue for the hot wires and white for the neutral wire. As indicated by the dots in the crossings of the horizontal and vertical lines in the diagram 11, all wires connected to the A phase have black insulation, all wires connected to the B phase have red insulation and all wires connected to the C phase have blue insulation.

A similar arrangement is utilized with the higher voltage system with the A phase being brown, the B phase being orange and the C phase being yellow.

In use, a length of wire 12 with black insulation is provided with the marker number 1 at each end. One end of this wire is connected to terminal 1 at the panel and the other end of this wire is brought out at the outlet box adjacent the chalk mark 1. A red insulated wire 13 and a blue insulated wire 14 are similarly marked with numbers 3 and 5, respectively, and connected at panel terminals 3 and 5, respectively, and brought out at boxes marked 3 and 5, respectively. This procedure is continued for as many wires as are indicated by the wiring diagram.

In making such installations, the electrician must remember the wire colors and panel phases and terminals or make continuous reference to the wiring diagram in order to insure that proper wire connections are being made. There is always the chance for error, which sometimes can be expensive and/or dangerous.

The conventional method used by electricians for memorizing circuit number, phase and color, for a 3 phase 4 wire system, is to mentally visualize the color and circuit number in "divisions of 6"; thus: 6; 12; 18; 24; 30; 36; 42; =42 circuits.

The low voltage code is memorized as "BRB=BLK-RED-BLU=A-B-C; circuits 1 and 2=black; 3 and 4=red; 5 and 6=blue; etc." The high voltage is memorized in the same manner—"BOY=Brown-Orange-Yellow=A-B-C; circuits 1 and 2=brown; 3 and 4=orange; 5 and 6=yellow; etc." Then every 6th circuit is "C" phase (blue or yellow).

For example; when the question is asked "What color wire is circuit 28 on low voltage?", the required thought process is—closest "divisions of 6" to circuit 28=24 and 30; count forward: 25 and 26=BLK; 27 and 28=RED; count back: 30 and 29=BLU; 28 and 27=RED; and the answer is: 28=RED="B" phase.

The apprentice electrician is trained in this method, when pulling wire with a journeyman in the field. Using this method for memorizing color and circuit number can be confusing.

If a mistake is made by pulling the wrong color wire, imbalance of load will occur. Corrections must be made by repulling the right color wire to the right circuit. Such simple errors add up and can be costly in correction time.

SUMMARY OF THE INVENTION

It is an object of the present invention to provide a new and improved system for marking electrical wires and wire locations and a method for installing electrical wires, which are simple and reliable and which do not require memory and recall of wiring arrangements or repeated references to a wiring diagram which often is bulky, difficult to unfold or unroll in crowded locations and subject to damage.

The present invention reduces errors in wiring and avoids costly corrections by providing a visual pattern system for wiring information which avoids reliance on memory and mental steps in electrical installations. The invention makes tracing of wiring during trouble shooting much simpler and quicker. The invention provides the worker with an overall view of the wiring system with codes which stand out from the conventional wiring diagram and floor plan used in installing electrical wiring and electrical devices, such as sockets, switches, light fixtures and the like.

More specifically, the invention includes a system for marking a plurality of separate electrical wires and electrical outlet locations in electrical construction wiring between a circuit breaker panel and a plurality of outlet boxes pursuant to a wiring diagram, including a marker carrier for carrying a plurality of separably adhered markers, a first set of wire markers comprising a first plurality of pairs of separable wire markers distinctively coded in a first manner and divided into a second plurality of subsets with wire markers of each subset further distinctively coded in a second manner, and a second set of outlet box markers comprising a corresponding second plurality of separable box markers distictively coded in the first manner, and further distinctively coded in the second manner. The invention also includes a method for installing electrical wires using the system.

In the presently preferred embodiment of the invention, the wire markers are of one geometrical shape and the box markers are of a different geometrical shape in order to improve recognition. Also, the first manner of coding is numerical and the second manner of coding is color, thereby providing two indicia in a single component.

DESCRIPTION OF THE PREFERRED EMBODIMENTS

Figure 3:
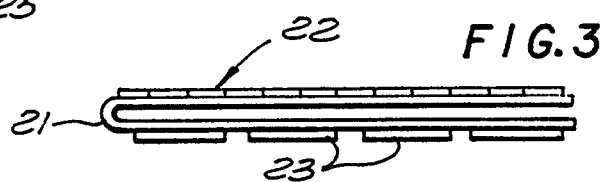
FIG. 3 is a side view of the package of FIG. 2 in the folded position.
Figure 4:
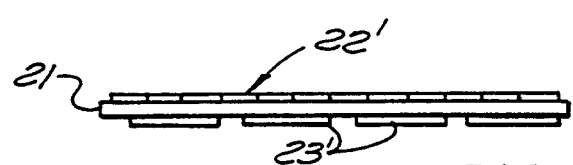
FIG. 4 is a side view of an alternative embodiment showing wire markers and box markers on opposite sides of a single carrier.
Figure 5:
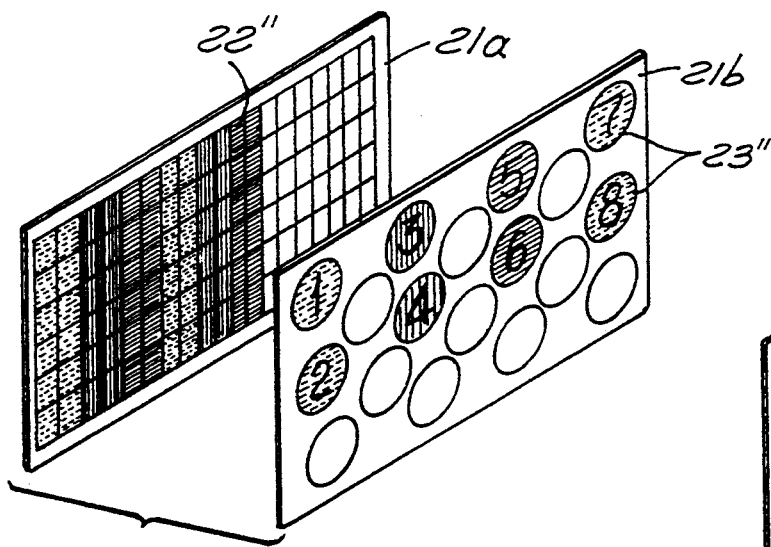
FIG. 5 is a view of another alternative embodiment with the wire markers and box markers on separate carriers.
Figure 6:
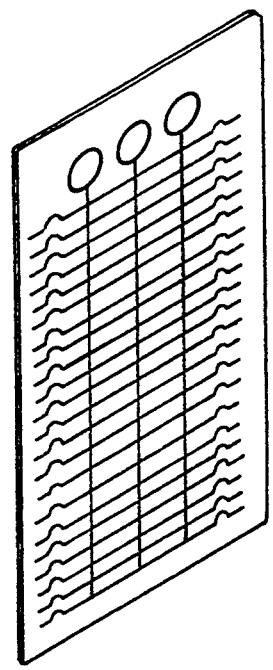
FIG. 6 is a view of the reverse of a carrier with the diagram of a breaker panel printed thereon for reference purposes.

The system of the invention includes a package comprising a carrier or substrate 21, a set of wire markers 22, and a set of outlet box markers 23, with the markers carried on the carrier with each marker of each set being separably peelable from the carrier. In the embodiment illustrated in FIGS. 2 and 3, the wire markers and box markers are positioned on the same side of the substrate, which substrate may be used in the unfolded position of FIG. 2 or in the folded position of FIG 3. Other arrangements for the package may be used, such as flaring the wire markers 221 and box markers 231 on opposite surfaces of the substrate as shown in FIG. 4. Another alternative configuration is to have the wire markers 22" on a substrate 21a and the box markers 23" on a separate substrate 21b, as shown in FIG. 5. If desired, the diagram of the panel 11 may be printed on one surface of the substrate, as shown in FIG. 6.

In the preferred embodiment illustrated, there is a first set of the wire markers 22 numbered sequentially 1 through 42. Twenty-one of these are odd numbers and twenty-one are even numbers. The twenty-one odd numbers shown on the left of the panel diagram 11 will be discussed further. The twenty-one even numbered terminals are handled in the same manner as are the twenty-one odd numbered terminals.

A pair of the wire markers 22 is provided for each panel terminal number, such as the rectangular strip 24 with three the number 1 thereon, and the rectangular strip 25 with three the same number thereon. The sequential numbering of the wire markers provides a distinctive coding in a first manner so that each of the pairs of wire markers is identified separately from every other pair of wire markers.

The set of twenty-one pairs of wire markers for the odd numbered terminals is divided into a plurality of subsets, here three subsets of seven wires each. The first subset is for the A phase, using the black insulated wires, the second subset is for the B phase using red insulated wires, and the third subset is for the C phase using blue insulated wires. The wire markers for each of the subsets are further distinctively coded in a second manner so that all the wire markers of a subset are different from the wire markers of each of the other subsets. In the preferred embodiment illustrated, the wire markers for subset A, comprising wire terminals 1, 7, 13, 19, 25, 31 and 37 are colored black, the wire markers for the B subset, comprising 3, 9, 15, 21, 27, 33 and 39, are colored red, and the third subset, comprising 5, 11, 17, 23, 29, 35 and 41, are colored blue.

The outlet box markers 23 are similarly coded. In the embodiment illustrated, the outlet box markers are coded with numbers in the first manner and with colors in the second manner. Hence the box markers are coded numerically in sequence, with box markers 1, 7, 13, 19, 25, 31 and 37 also colored black. Similarly box markers numbered 3, 9, etcetera, are colored red and box markers numbered 5, 11, etcetera, are colored blue. As previously mentioned, the coding for the even numbered wire markers and box markers are the same as for the preceding odd numbered markers. That is, wire markers and box markers numbered 2, 8, 14, 20, 26, 32 and 38 are black, markers 4, 10, etcetera, are red and markers 6, 12, etcetera, are blue. The preferred form for a box marker is a circular peelable label with an overall color and a superimposed number. Various alternative forms may be used, such as square or rectangular and such as being partially colored, with the number on the uncolored portion.

Figure 2:
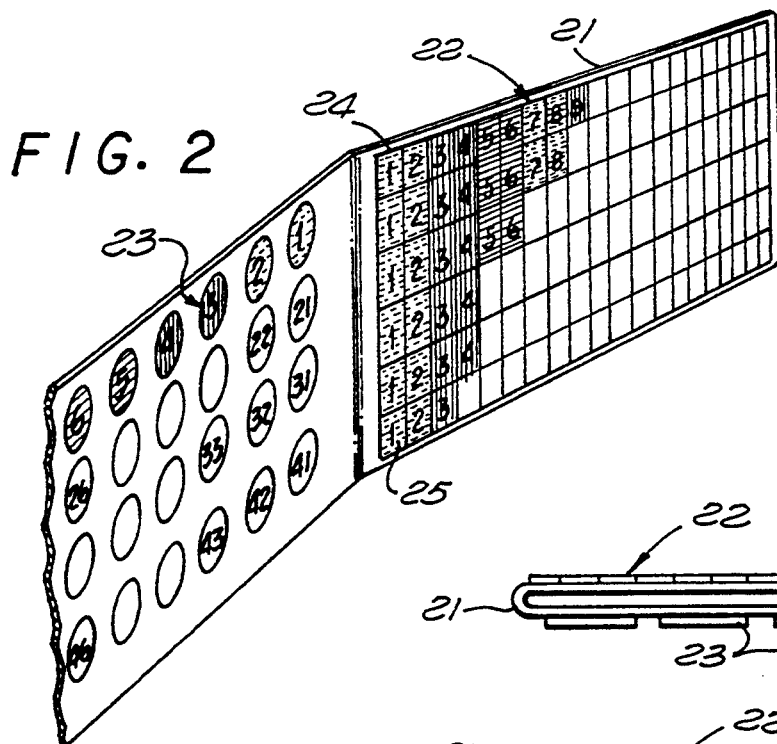
FIG. 2 is a perspective view of a package with wire markers and box location markers on a single carrier, in the open position.

Referring now to FIG. 2, the wire markers with code numbers 1 and 2 are black, those with code numbers 3 and 4 are red, and those with code numbers 5 and 6 are blue, and repeating with code numbers 7 and 8 black, etc. Similarly, box markers 1 and 2 are black, 3 and 4 are red, 5 and 6 are blue, 7 and 8 are black, etc.

The panel itself will have the terminal numbers thereon, as shown at 11. If the panel is not numbered, normally the electrician will add the numbers to facilitate the installation. Working from the wiring diagram, a box marker is applied to each box, with the number of the box marker corresponding to the terminal number from the wiring diagram. If desired, a box marker may be applied to the breaker and/or the breaker panel. Also a box marker may be applied to the wall or floor at the outlet location and/or the socket or other fixture and to the coverplate. Box markers may also be applied to the wiring diagram to improve visual tracing of the wiring and reduce the likelihood of error.

A pocket size code guide relating colors and numbers for the three phases and for both low and high voltages can be provided for each worker.

In the use of the system in installing wiring, the required electric wires for the particular installation are selected, with the wire insulation colored appropriately. The black wire for panel terminal 1 has the pair of black wire markers with number 1 peeled from the substrate, with one marker of the pair affixed at each end of the wire. The wires for the other terminals are similarly prepared.

Figure 1:
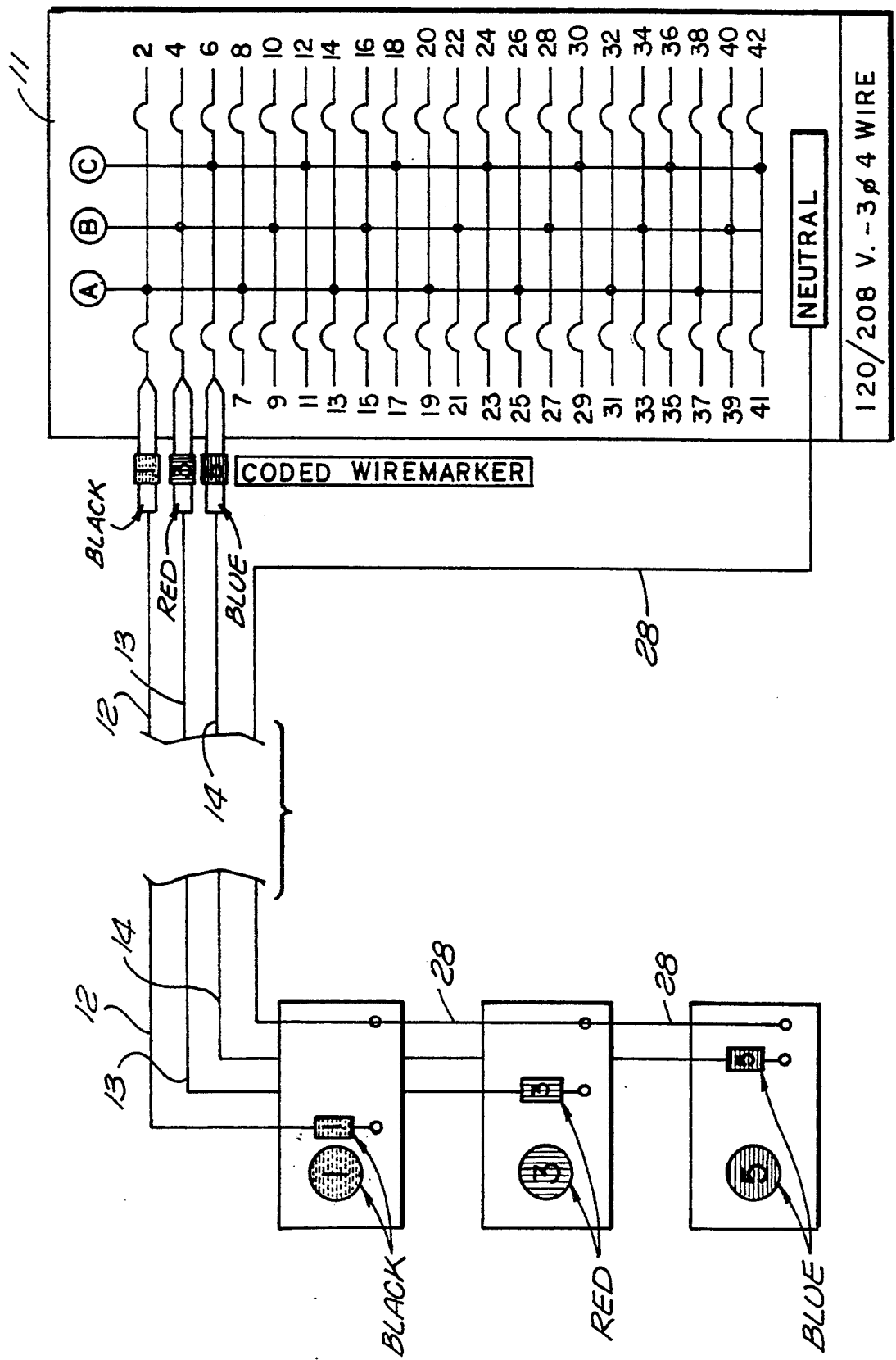
FIG. 1 is an electrical diagram illustrating the electrical connections of the present invention utilizing a conventional breaker panel.

The wires are then installed between the panel and the individual outlet boxes. In the installation embodiment illustrated in FIG. 1, the wires for terminals for 1, 3 and 5 and the neutral are run through a suitable conduit to the outlet boxes identified as 1, 3 and 5. The white neutral wire 28 is brought to the appropriate terminal in each of the outlet boxes numbered 1, 3 and 5. The black wire 12 carrying the marker number 1 is terminated at the outlet box with the marker number, with both markers also colored black. Similarly, the red wire 13, numbered 3, is terminated at the outlet box with the box marker 3 with wire markers and box markers colored red. The blue wire numbered 14 is terminated at the box with the box marker 5 with both the wire and box markers colored blue. This operation is repeated for all of the outlet boxes to be serviced from the particular panel.

I claim:

1. An article of manufacture for marking a plurality of separate electrical wires and electrical outlet locations in electrical construction wiring between a circuit breaker panel and a plurality of outlet boxes pursuant to a wiring diagram, comprising marker carrier means for carrying a plurality of separably adhered markers, a set of wire markers on said carrier means, said set of wire markers comprising a plurality of pairs of separable wire markers distinctively coded in a first manner to be different from other pairs of said wire markers, and divided into a plurality of subsets with said wire markers of each subset further distinctively coded in a second manner to be different from pairs of said wire markers of other of said subsets, and a set of outlet box markers on said carrier means, said set of outlet box markers comprising a corresponding plurality of separable box markers distinctively coded in said first manner, and further distinctively coded in said second manner to be different from other of said box markers, wherein said first manner of distinctive coding is numerical and said second manner of distinctive coding is color, with said outlet box markers positioned on said marker carrier means at a location spaced from the location of said wire markers.

2. A system as defined in claim 1 wherein said plurality of subsets is three and said plurality of pairs is a multiple of three.

3. An article of manufacture for marking a plurality of separate electrical wires and electrical outlet locations in electrical construction wiring between a circuit breaker panel and a plurality of outlet boxes pursuant to a wiring diagram, comprising marker carrier means for carrying a plurality of separably adhered markers, a set of wire markers on said carrier means, said set of wire markers comprising a multiple of three pairs of separable wire markers distinctively numerically coded to be different from other pairs of said wire markers, and divided into three subsets with said wire markers of each subset further distinctively color coded to be different from pairs of said wire markers of other of said subsets, each of said wire markers further being of a first geometrical shape, and a set of outlet box markers on said carrier means, said set of outlet box markers comprising three separable box markers distinctively numerically coded, and further distinctively color coded to be different from other box markers, each of said box markers further being of a second geometrical shape different from said first geometrical shape, with said outlet box markers positioned on said marker carrier means at a location spaced from the location of said wire markers.

4. In a method for installing a plurality of separate electrical wires in electrical construction wiring between a circuit breaker panel and a plurality of outlet boxes pursuant to a wiring diagram, the steps of:

placing the markers of a pair of wire markers adjacent each end of each of a plurality of electrical wires with the wire markers for each wire distinctively coded in pairs in a first manner to be different from other pairs of wire markers, and further distinctively coded in groups of wires in a second manner to be different from other pairs of the wire markers of other groups, including selecting the first manner to be numerical and the second manner to be color, and selecting the number of groups to be three, and making the wire markers of one geometrical shape and the box markers of a different shape;

placing outlet box markers at outlet boxes with each box marker distinctively coded in the first manner and in the second manner to be different from other box markers;

connecting one end of each of the electrical wires to the terminal in the circuit breaker panel corresponding in the first and second manners to the wire marker on the one end of the wire; and connecting the other end of each of the electrical wires to the outlet box corresponding in the first and second manners to the wire marker on the other end of the wire and to the box marker at the outlet box.

* * * * *